United States Patent [19]

Reischl

[11] 4,137,360

[45] Jan. 30, 1979

[54] MICROPOROUS SHEETS AND A PROCESS FOR MAKING THEM

[75] Inventor: Artur Reischl, Leverkusen, Germany

[73] Assignee: Bayer Aktiengesellschaft, Leverkusen, Fed. Rep. of Germany

[21] Appl. No.: 501,321

[22] Filed: Aug. 28, 1974

[30] Foreign Application Priority Data

Sep. 7, 1973 [DE] Fed. Rep. of Germany ....... 2345257

[51] Int. Cl.$^2$ .............................................. B32B 27/40
[52] U.S. Cl. ...................................... 428/310; 264/41; 427/246; 428/320; 428/425; 428/447; 521/62; 521/86; 521/137
[58] Field of Search ........................... 117/63, 161 KP; 260/2.5 AY, 2.5 AM, 2.5 AH, 46.5 E; 264/41; 427/246; 428/310, 320, 425, 447

[56] References Cited

U.S. PATENT DOCUMENTS

| | | | |
|---|---|---|---|
| 3,243,475 | 3/1966 | Reischl et al. | 260/824 |
| 3,296,190 | 1/1967 | Reischl et al. | 260/824 |
| 3,529,990 | 9/1970 | Becker et al. | 260/46.5 |
| 3,567,499 | 3/1971 | Klebert et al. | 117/161 |
| 3,575,894 | 4/1971 | Zorn et al. | 117/63 |
| 3,582,393 | 6/1971 | Skikada | 427/246 |
| 3,586,525 | 6/1971 | Minobe et al. | 117/161 |
| 3,619,250 | 11/1971 | Nishijima | 427/246 |
| 3,625,871 | 12/1971 | Traubel et al. | 260/2.5 |
| 3,639,145 | 2/1972 | Fujita et al. | 117/161 |
| 3,645,775 | 2/1972 | Schulze et al. | 427/246 |
| 3,729,536 | 4/1973 | Warwicker | 264/41 |
| 3,763,054 | 10/1973 | Reischl et al. | 264/41 |

*Primary Examiner*—Michael F. Esposito
*Assistant Examiner*—Sadie L. Childs
*Attorney, Agent, or Firm*—Gene Harsh; Lawrence S. Pope; Frederick H. Colen

[57] ABSTRACT

A method is provided for making microporous, vapor-permeable polyurethane sheets by coagulating a polyurethane in a polar solvent with a non-solvent for the polyurethane, wherein a polyurethane polysiloxane is added to the solution of the polyurethane in the polar solvent.

9 Claims, No Drawings

MICROPOROUS SHEETS AND A PROCESS FOR MAKING THEM

This invention relates to an improved process for producing microporous sheets by coagulating polyurethane or polyurea solutions.

Numerous processes are already known for the production of coatings which are permeable to water vapor from solutions of polyurethanes (e.g. in dimethylformamide) by coagulating them with non-solvents (e.g. water). The desired microporous structure of the polymers is achieved in these processes only by observing very specific conditions for the coagulation process.

The use of polyurethane or polyurethane urea solutions in highly polar solvents such as dimethylformamide or dimethyl acetamide, to which other polymers such as polyvinyl chloride or polyacrylonitrile may be added for producing films or coatings on fabrics or as binders for non-woven fibrous webs by processes in which the solvent is removed by treatment with water, glycerol or other liquids which are miscible with the aforesaid highly polar solvents but incompatible with the polyurethanes was first described in German Pat. No. 888,766 which also discloses the use of other solvents which are generally non-solvents for the polyurethane, e.g. methylene chloride, acetone or benzene.

In numerous later publications, special process steps are described which are designed to ensure that the products obtained will have a microporous structure. In German Pat. No. 1,110,607, for example, it is proposed to carry out the coagulation of polyurethanes based on polyethers by exposing hygroscopic polyurethane solutions, using solvents such as dimethylformamide, for example, to the action of a stationary or circulating atmosphere which is charged with water vapor and has a relative humidity of 15% to 100% at a temperature of 10° to 38° C. measured with a dry thermometer. The absorption of water which occurs due to the hygroscopic nature of the solvent causes the polyurethane to precipitate from the solution on the surface, presumably with preformation of the microporous structure. When films or coatings which have been pregelled by this method are placed into water, the solution coagulates and the hygroscopic solvent is completely removed from the film.

The method described in German Auslegeschrift No. 1,110,607 requires the use of an atmosphere in which the moiture content is accurately adjusted and long exposure times in this moist atmosphere. The results, however, are hardly reproducible and evidently only polyether urethanes can be treated by this method. If the step of pregelling by the action of the moist atmosphere described above is omitted, the products obtained are either transparent and impermeable films or non-homogeneous films with large pores, which are unsuitable for the intended purpose.

German Offenlegungsschrift No. 1,444,163 describes a slightly modified process. By the addition of minor proportions of non-solvents (e.g. water), the polyurethane solution is first converted into a state of beginning phase separation, i.e. into a slightly cloudy form resembling a dispersion, before it is coagulated by immersion in the non-solvent (after having been painted on a substrate), this coagulation being carried out directly, in other words without the preliminary stage of gelling in a moist atmosphere.

When carrying out the process described in German Offenlegungsschrift No. 1,444,163, it is difficult to find exactly the right quantity of non-solvent for preparing the colloidal dispersions. Moreover, the process uses starting materials in an unstable state in the sense that the properties of the dispersion change with time and depending on the temperature and degree of moisture, and the elastomer dispersions are converted into a viscous state which can no longer be shaped easily.

Another process is described in German Offenlegungsschrift No. 1,444,165, according to which the polymer solution is said to be converted into microporous sheetings by direct coagulation in a mixture of non-solvent and solvent (e.g. dimethylformamide/water in proportions ranging from 10:90 to 95:5) without the preliminary gelling stage.

The method described in German Offenlegungsschrift No. 1,444,165 requires prolonged coagulation times, especially if baths with large quantities of solvents are used, because the polyurethane coagulates only slowly. The capacity of a given plant is therefore substantially reduced.

According to another variation described in Belgian Pat. No. 624,250, sufficient non-solvent is added to the polyurethane solution to cause the polymer to separate in the form of a gel. This gel is then painted on a substrate and coagulated with non-solvent (water) to form a microporous structure. In this process, it is in practice difficult to remove the gel and convert it into a homogeneous coating.

According to German Auslegeschrift No. 1,238,206, direct coagulation of elastomer solutions leads to the formation of microporous structures if the coated substrates are coagulated in baths which are heated to temperatures close to the boiling point of the bath liquid, e.g. to 95° C. in the case of water.

Slightly improved results are obtained if preliminary gelling is also carried out at elevated temperatures, for example, German Offenlegungsschrift No. 2,025,616 describes a process for the production of microporous sheets in which a thin layer of polyurethane solution is exposed to a water vapor atmosphere with a relative humidity of at least 50% at temperatures above 65° C., the major quantity of solvent is then removed in aqueous coagulation baths and the sheets are then dried.

According to German Offenlegungsschrift No. 2,125,908 steam is passed over a layer of polyurethane solution at a temperature of between 101° C. and 190° C. until the quantity of organic solvent in the layer has been reduced to less than 50% by weight and the layer has been converted into a firm, mechanically stable microporous sheet. This process has the special advantage that a microporous end product is obtained from a polyurethane solution within a short time and by a single process step.

The state of the art described above would lead one to suspect that it should, in principle, be possible to obtain films or coatings with a microporous structure by coagulating polyurethane solutions under any process conditions (temperature, ratio of solvent to precipitating agent, pregelling time, coagulation bath). In practice, however, it is found that the processes described above result in usable end products only with a very low degree of certainty and only when quite specific polymer solutions are used, especially if the process is to be developed from the laboratory stage to the mass production stage. Even minor variations in the chemical structure of a polyurethane often result in sheets which are homogeneous, transparent and impermeable to water vapor, even if the conditions of the process are otherwise completely identical. The starting materials which are found to be particularly sensitive in this respect are the higher molecular weight polyesters and polyethers with hydroxyl end groups used for synthesizing the polyurethane. In some cases the products may even vary from microporous to homogeneous when using different batches of the same starting materials. Even suitable basic types of polyesters or polyethers must therefore be tested from batch to batch to ensure the coagulability of the polyurethane solution and selected accordingly. To determine whether the starting components qualify as suitable for the process, however, it is not possible to use the usual parameters such as molecular weight, hydroxyl number, etc. since often apparently quite identical products result in polyurethane solutions with completely different coagulation performances. It is therefore necessary in each individual case to prepare samples of elastomer solutions and carry out their coagulation on a commercial scale in order to determine the particular process conditions which are required in each individual case and which must usually be observed within very narrow limits. Many reaction mixtures, however, invariably result in only partly microporous or transparent sheets.

No explanation has so far been found for these surprising effects. In spite of numerous attempts, it was not possible to discover any particular components in the raw materials or elastomer solutions which were responsible for preventing coagulation of the solutions to form microporous products.

It has also been variously proposed to add certain coagulating agents to the polymer solutions to improve their coagulation, for example, German Auslegeschrift No. 1,270,276 and Offenlegungsschrift Nos. 1,694,171 and 1,769,277 describe processes for producing sheets which are permeable to water vapor in which solutions of 90 to 70 parts by weight of polyurethanes or polyureas which are free from isocyanate groups and 10 to 30 parts by weight of high molecular weight, substantially linear cationic polyurethanes which contain 0.5% to 2.0% by weight of quaternary ammonium nitrogen atoms are coagulated with water or a mixture of water and solvent, optionally after gelling in moist air. These solutions may also contain anionic tanning agents as coagulation regulators in addition to the cationic polyurethanes.

Although the addition of known coagulating agents of this kind provides distinct improvements in the coagulability of polyurethane solutions, especially in reaction mixtures on a laboratory scale, when the method is employed on a mass production scale the difficulties described above persist. The coagulability of the polyurethane varies so much from one batch to another that it remains necessary to go to the great expense of testing each elastomer solution for its suitability before it is used.

It is therefore an object of this invention to provide a process for making microporous polyurethane or polyurethane urea sheets which is devoid of the foregoing disadvantages. Another object of the invention is to provide a process for making polyurethane or polyurethane urea sheets which can be relied upon to repeatedly produce a microporous structure. Still another object of the invention is to provide a process for making a microporous polyurethane or polyurethane urea sheet from a polymer solution which can tolerate some variation in specifications of the raw materials and variation in processing techniques and still produce consistently a microporous sheet.

The foregoing objects and others are accomplished in accordance with this invention, generally speaking, by providing a process for making microporous polyurethane or polyurethane urea sheets wherein a solution containing a polysiloxane polyurethane or polysiloxane polyurethane urea in a polar solvent therefore is coagulated to form the microporous product.

It has now surprisingly been found that the range of choice in the selection of batches of raw materials can be substantially increased, the production of elastomer solutions can be simplified and the coagulation process can be rendered more reproducible if the polyurethane solutions which are to be coagulated contain certain polyurethane polysiloxane or polyurethane polysiloxane ureas.

This invention therefore provides a process for the production of microporous sheets which are permeable to water vapor by coagulating hygroscopic polyurethane or polyurethane urea solutions which may contain ionic polyurethane or polyurethane urea dispersions, characterized in that the polyurethane or polyurethane urea solution contains a product with the following structural units

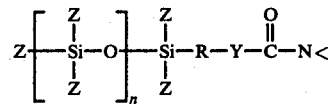

in which $n \geq 2$, preferably an integer of between 5 and 100,

Z represents a $C_1$ to $C_5$ alkyl, $C_6$ to $C_{15}$ aryl, siloxyl or siloxanyl group, preferably a methyl group, or

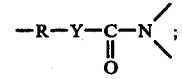

the groups Z may be the same or different but preferably only one of the substituents Z attached to a silicon atom is the group

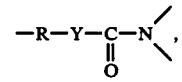

R represents an alkylene group which may contain hetero atoms and

Y represents —NH—, —O— or —S— and the total quantity of siloxane sequences in the microporous polyurethane sheet is from 0.1% to 20% by weight, preferably 0.3% to 5% by weight.

It is a particularly surprising effect of the process according to the invention that the presence of even very small quantities of siloxane sequences built into the polyurethane urea molecules (from about 0.10% by weight, based on the dry weight of finished sheet) is sufficient to regulate the coagulation of polyurethane solutions which could previously not be processed and to stabilize the pore structure to such an extent that sheets with a suitable microporous structure are obtained.

It is essential that the siloxane groups should be chemically built into the polyurethane by way of carbon bridges, e.g. in accordance with the formula

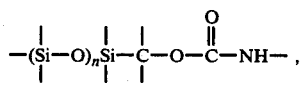

If for comparison, one uses organofunctional siloxanes which have not been reacted with isocyanates or if polysiloxane oils (silicones) which will not react with isocyanates are used for preparing the polyurethanes, then again only an irregular cell structure, if any, is formed in the sheet. Moreover, the tendency of silicone oil to migrate makes uniform application of the usual finishes on the end product impossible.

The silicone compounds known as polyurethane foam stabilizers are also commercially unsatisfactory for use as coagulation cell regulators because, at the necessary stage of degasification of the polyurethane elastomer solutions, they cause excessive and prolonged foaming and they are usually soluble in water, with the result that at least part of the silicone compounds are washed out in the coagulation process and interfere with recovery of the organic solvent, e.g. dimethylformamide.

In the process according to the invention, it is preferred to synthesize the major proportion of the polyurethane (about 50% to about 99.5% by weight, preferably about 75% to about 99.5% by weight) free from siloxane groups and then to add only shortly before coagulation about 0.5% to about 50% by weight, preferably about 0.5% to about 25% by weight of a polyurethane, either in a dissolved form or as an aqueous dispersion, which contains a sufficiently high proportion of built-in siloxane sequences, so that the siloxane content of the polymer solution which is to be coagulated is at least about 0.1% by weight, based on the solids content of the polyurethane solution. These polysiloxane polyurethanes preferably have a siloxane group content of about 1% to about 60% by weight, preferably about 10% to about 50% by weight, and a molecular weight of about 5000 to about 30,000 and preferably above about 10,000.

Numerous compounds available by a wide variety of different methods are suitable for use as siloxane-free polyurethanes for the process according to the invention, but all the compounds which are suitable contain the typical urethane group (see Ullmann, Enzyklopadie der technischen Chemie, 4th Edition, Volume 14, pages 338 to 363), for example, polyurethanes in the strict sense of the word, which can be obtained from higher molecular weight polyhydroxyl compounds, glycols and organic diisocyanates by a single stage or multistage process, by way of isocyanate prepolymers, may be used. For example, polyesters or polyethers may be reacted with an excess of diisocyanates to produce isocyanate prepolymers which are then chain-lengthened with equivalent or slightly less than equivalent quantities of diol compounds such as butane-1,4-diol, N-methyl-diethanolamine, hydroquinone-bis-hydroxyethyl ether or terephthalic acid-bis-hydroxyethyl ester, either with or without solvent. Alternatively, the elastomers may be obtained directly by reaction of the components in a single stage process and then dissolved in highly polar solvents.

Polyurethane ureas of the kind described as "Component a" in U.S. Pat. No. 3,575,894 are also particularly suitable. To prepare these compounds, higher molecular weight, substantially linear polyhydroxyl compounds which contain hydroxyl end groups and have a molecular weight of between about 400 and about 5000 and optionally also other, low molecular weight glycols, aminoalcohols or diamines are first reacted with an excess of organic diisocyanate to form a prepolymer which contains isocyanate end groups and this prepolymer is then reacted with water or with bifunctional compounds in which at least one of the hydrogen atoms which are reactive with isocyanates is attached to nitrogen. Owing to the substantially higher reactivity and reaction velocity of these chain lengthening agents compared with diols, the reaction is preferably carried out in a highly polar, water-soluble solvent with a boiling point above 100° C.

The preparation of such polyurethanes and polyurethane ureas and their solutions has been described, for example, in U.S. Pat. Nos. 2,755,266; 3,432,456; 3,305,533 and 3,367,899; German Auslegeschriften Nos. 1,183,196 and 1,186,618; Belgian Patent Specification Nos. 649,619; 646,637; 658,363; 664,344; 664,346 and 666,208; French Patent Nos. 1,380,082; 1,371,391 and 1,383,077 and U.S. Pat. Nos. 2,957,852, 2,929,803; 2,929,804 and 3,040,003.

Higher molecular weight, substantially linear polyhydroxyl compounds with hydroxyl end groups which are suitable for preparing elastomer polyurethanes are, for example, polyesters; polyester amides; polyethers; polyacetals, polycarbonates or poly-N-alkylurethanes or mixtures thereof; including also those which contain ester, ether, amide, urethane or N-alkylurethane groups, with molecular weights between about 400 and about 5000 and melting points preferably between about 60° C. and about −50° C.

Any suitable polyester prepared from an aliphatic, cycloaliphatic, aromatic or heterocyclic dicarboxylic acid or its esters or anhydrides and a glycol, such as adipic acid, succinic acid, azelaic acid, sebacic acid, phthalic acid, isophthalic acid, phthalic acid anhydride, tetrahydrophthalic acid, hexahydrophthalic acid anhydride, endomethylene tetrahydrophthalic acid anhydride, glutaric acid, maleic acid, maleic acid anhydride, oxalic acid, terephthalic acid dimethyl ester, terephthalic acid-bis-glycolic ester, and a glycol or a mixture of glycols, e.g. ethylene glycol, propylene glycol -(1,2) and -(1,3),butane-1,4-diol, butane-1,2-diol, 2,2-dimethyl-propane-1,3-diol, hexane-1,6-diol, bis-hydroxymethyl-cyclohexane, diethylen glycol, triethylene glycol, tetramethylene glycol, dipropylene glycol, dibutylene glycol, glycerol, trimethylol propane or the like may be used. Glycols or mixtures of glycols, which contain five or more carbon atoms are preferred because of the high resistance to hydrolysis found in the polyesters prepared from them. Polyesters which are obtained by the condensation of caprolactone and amines or diols such as hexane-1,6-diol with a narrow molecular weight distribution are also suitable. Exceptionally good microporous sheets with excellent surface properties and permeability to water vapor are obtained from copolymers which have been prepared from 90% to 60% by weight of adipic acid and 10% to 40% by weight of terephthalic acid and a diol, preferably ethylene glycol, butane-1,4-diol; neopentylglycol and/or hexane-1,6-diol. Exceptionally high resistance to hydrolysis can be obtained in the polyurethanes if the higher molecular weight polyhydroxyl compounds used are dihydroxypolycarbonates based on hexane-1,6-diol or copolycarbonates which have been prepared with the addition of small quantities, (up to about 20 mol percent), of dicarboxylic acids, preferably adipic acid. Mixtures of the above mentioned compounds may also be used.

Polyurethane ureas with excellent resistance to hydrolysis can also be obtained from polyhydroxy polyethers, which may, if desired, also be used as copolyethers. Suitable polyethers may be prepared by methods known per se, e.g. by polymerisation of epoxides such as ethylene oxide, propylene oxide, butylene oxide, tetrahydrofuran or epichlorohydrin either with themselves, e.g. catalysed by boron trifluoride, or by using starting components with acidic hydrogen atoms such as alcohols or amines, e.g. water, ethylene glycol, propylene glycol- (1,3) or -(1,2), trimethylol propane, aniline, ammonia, ethanol amine, ethylene diamine etc. Polytetramethylenether diols are preferably used.

Graft polymers obtained from partially saponified ethylene-vinyl ester copolymers and vinyl compounds, as described in U.S. Patent 3,400,173 are also suitable higher molecular weight polyhydroxyl compounds.

The graft polymers are composed of from about 10% to about 70%, preferably from about 15% to about 60%, of an ethylene/vinyl ester copolymer which is from about 10% to about 80% saponified and originally contained from about 25% to about 75% vinyl ester, and from about 30% to about 90% of vinyl chloride polymer. The preparation of such polymers has been described, for example, in French Patent No. 1,409,527.

When preparing the graft polymers, minor quantities of other monomers may also be added, e.g vinyl esters, $\alpha,\beta$-unsaturated monocarboxylic and/or dicarboxylic acids, containing 3 or 4 carbon atoms, and their derivatives, e.g. hydroxyalkyl acrylates and methacrylates, or maleic acid semiesters. These monomer or monomer mixtures may amount to 40% of the total quantity of monomer mixture which is to be grafted on the stock. The preparation of these graft polymers has been described, for example, in U.S. Pat. No. 3,355,516.

Any suitable organic diisocyanate may be used either alone or in mixtures such as, for example, aliphatic, cycloaliphatic, araliphatic, aromatic or heterocyclic diisocyanates. Diisocyanates with a symmetric structure should be particularly mentioned, e.g. diphenylmethane-4,4'-diisocyanate; diphenyl-dimethylmethane-4,4'-diisocyanate; 2,2'-6,6'-tetramethyl-diphenylmethane diisocyanate; diphenyl-4,4'-diisocyanate; diphenylether-4,4'-diisocyanate or their alkylsubstituted, alkoxysubstituted or halogenated derivatives; tolylene-2,4- and -2,6-diisocyanate and their commercial mixtures; diisopropylphenylene diisocyanate; m-xylylene diisocyanate; p-xylylene diisocyanate; $\alpha,\alpha,\alpha',\alpha'$-tetramethyl-p-xylylene diisocyanate or their alkyl or halogen substitution products; dimeric tolylene-2,4-diisocyanate; bis-(methyl-4-isocyanatophenyl)-urea or naphthylene-1,5-diisocyanate. Aliphatic and cycloaliphatic diisocyanates such as hexamethylene diisocyanate; cyclohexane-1,4-diisocyanate; dicyclohexylmethane-4,4'-diisocyanate; 1-isocyanato-3-isocyanatomethyl-3,5,5-tri-methyl-cyclohexane or 2,2,4-trimethylhexane-1,6-diisocyanate give rise to products which undergo very little discoloration when exposed to light.

The diisocyanates preferably used are diphenylmethane-4,4'-diisocyanate; the isomeric tolylene diisocyanates; p-phenylenediisocyanate and, optionally only in portions, hexamethylene diisocyanate or dicyclohexylmethane-4,4'-diisocyanate.

The higher molecular weight organic polyhydroxyl compounds may be reacted with diisocyanates in molar ratios of between about 1:1.25 and about 1:5 either in several stages without solvent or in solvents which are inert towards isocyanates, such as tetrahydrofuran, dioxane, chlorobenzene or dimethylformamide, at temperatures of about 20° to 130° C. preferably 40° to 100° C.

The reaction times are adjusted to give rise to a substantially linear prepolymer with isocyanate end groups which, when reacted with approximately equivalent quantities of bifunctional chain lengthening agents, gives rise to a substantially linear elastomeric polyurethane or polyurethane urea which is soluble in polar solvents.

As already mentioned above, low molecular weight diols (molecular weight preferably below 250) such as ethylene glycol, butane-1,4-diol; bis-N,N-($\beta$-hydroxyethyl)-methylamine; bis-N,N-($\beta$-hydroxypropyl)-methylamine; N,N'-bis-hydroxyethylpiperazine or hydroquinone-bis-($\beta$-hydroxyethylether) may be used together with the higher molecular weight polyhydroxyl compounds. The low molecular weight diols are preferably used in quantities corresponding to about 0.1 to about 4 mols of hydroxyl groups of low molecular weight diols per mol of hydroxyl group of the higher molecular weight polyhydroxyl compounds. Diols which contain tertiary nitrogen increase the dye absorption, improve the light fastness and provide the active points for subsequent after-treatments, e.g cross-linking reactions with strongly alkylating compounds.

The isocyanate group content of the prepolymers (based on the solvent-free prepolymer) is of major importance in determining the properties of the resulting polyurethane ureas. It must be at least about 0.75% by weight and should preferably be between about 1% and about 7.6% by weight, and in particular between about 1.5% and 5.5% by weight in order that the polyurethane ureas will have sufficiently high melting points, tear resistances, elongations at break and stress properties. If the chain lengthening reaction is carried out with water, the isocyanate content is preferably higher, e.g. between 3.5% and 7.6% by weight, because some of the isocyanate groups are then first saponified to amino groups.

The chain lengthening agents should have a molecular weight of between 18 and about 500, preferably 32 to about 350, and if desired they may be used as mixtures or added stepwise. Suitable chain lengthening agents apart from water and the low molecular weight diols mentioned above include for example, ethylene diamine; propylene-1,2- or -1,3-diamine; tetramethylene-1,4-diamine; hexamethylene-1,6-diamine; 2,2,4-trimethylhexane-1,6-diamine; 1-methylcyclohexane-2,4-diamine; 4,4'-diaminodicyclohexylmethane; bis-(aminopropyl)methylamine; N,N-bis-(aminopropyl)-piperazine; araliphatic diamines such as 1,5-tetrahydronaphthalene or aromatic diprimary amines such as 4,4'-diaminodiphenylmethane; 4,4'-diaminodiphenylether; 1-methyl-2,4-diaminobenzene or araliphatic diprimary diamines such as m-xylylene diamine; p-xylylene diamine; $\alpha,\alpha,\alpha',\alpha'$-tetramethyl-p-xylylene diamine or 1,3-bis-($\beta$-aminoisopropyl)-benzene; hydrazide compounds such as carbodihydrazide; adipic acid dihydrazide; succinic acid dihydrazide; glutaric acid dihydrazide; pimelic acid dihydrazide; hydracrylic acid dihydrazide;

terephthalic acid dihydrazide; isophthalic acid dihydrazide; β-semicarbazidoethane-carbazic ester; β-aminoethyl-semicarbazide; β-semicarbazido-propionic acid hydrazide; 4-semicarbazidobenzoic acid hydrazide; hydrazine hydrate or N,N'-diaminopiperazine. These chain lengthening agents may be used singly or as mixtures or together with water. Secondary diamines may also be used (but preferably less than 30 mols percent), particularly those with a symmetric structure such as piperazine or 2,5-dimethyl-piperazine.

When mixtures of chain lengthening agents are used, the solubility of the polyurethane ureas generally increases and the melting point of the elastomer falls. Particularly preferred chain lengthening agents are butane-1,4-diol, ethylenediamine, m-xylylene diamine, hydrazine, carbodihydrazide, aliphatic dicarboxylic acid hydrazides such as glutaric acid dihydrazide and water.

The reaction of the isocyanate prepolymers with the chain lengthening agents is carried out in highly polar, water-soluble solvents which have boiling points above 130° C. such as solvents which contain amide or sulphoxide groups and have the capacity to form strong hydrogen bridge bonds, for example, dimethylformamide; N-methylpyrrolidone; diethylformamide; dimethylacetamide; formylmorpholine; hexamethylphosphoramide; dimethylsulphoxide; tetramethylurea and the like or mixtures thereof. Dimethylformamide is the solvent preferred for commercial use. A certain proportion of the solvent, amounting to about 35% by weight of the total quantity of solvent, depending on the chemical composition of the polyurethane, may comprise less highly polar solvents which are not capable of dissolving the polyurethane ureas on their own, for example, tetrahydrofuran, dioxane, acetone or glycol monomethylether acetate. The concentration of the elastomer solutions should preferably be about 5 to 33% by weight, in particular 15 to 27% by weight and the viscosities are preferably between 1 and 1000 poises/25° C., more particularly between 50 and 800 poises/25° C.

Other suitable polyurethane elastomers also include those which are obtained by reacting bis-chlorocarbonic acid esters with diamines or bis-carboxylic acid chlorides with diamines; one of the components should in each case preferably be a higher molecular weight compound with a molecular weight of about 400 to about 5000. The reaction products of higher molecular weight bis-chloroformic acid esters of polyhydroxyl compounds with diamines and the reaction products of higher molecular weight compounds which contain amino end groups (prepared e.g. from polyhydroxyl compounds and diisocyanates and chain lengthening with a large excess of compounds which contain amine end groups) and bis-acid chlorides or bischloroformic acid esters are examples of such polyurethane elastomers. These compounds have been mentioned e.g. in U.S. Pat. Nos. 2,929,801; 2,929,802; 2,962,470 and 2,957,852. Segmented polyester or polyether elastomers such as those described, for example, in French Patent Nos. 1,354,553 and 1,359,090 and Belgian Patent No. 574,385 are also suitable.

It is a special advantage of the process according to the invention that it may also be successfully carried out with more rigid polyurethanes than heretofore. The coagulability of a polyurethane solution and the resistance of the end product to hydrolysis generally increase with increasing tendency of the polymer to crystallization (as, for example, by using a polycarbonate as higher molecular weight diol component or by using prepolymers with a high isocyanate group content). At the same time, however, the mechanical properties of the microporous sheets deteriorate due to increasing hardness, stiffness and tendency to crystallize at low temperatures.

If, on the other hand, the conditions are selected to produce softer polyurethanes, then the polymer solutions are difficult or even impossible to coagulate to microporous sheets. The polyurethanes which contain siloxane sequences used according to the invention, on the other hand, not only have the property of acting as coagulation regulators but also the advantage of having a migration resisting, powerful softening effect so that harder polyurethanes can be used without increasing the cold sensitivity of the products of the process.

The polyurethane polysiloxanes to be used according to the invention have been described in British Pat. No. 1,176,490 and in U.S. Pat. Nos. 3,243,475 and 3,296,190. The starting materials for preparing them are organopolysiloxanes which contain at least one and preferably two carbofunctional groups which are attached to silicon and contain hydrogen atoms capable of reacting with isocyanates. The carbofunctional groups are preferably aliphatic hydrocarbon groups which contain 1 to 6 carbon atoms and which may also contain hetero atoms and which have at least one hydroxyl, carboxyl, mercapto or primary or secondary amino group.

The following are examples of such carbofunctional groups:

hydroxy methyl

—CH₂OH hydroxybutyl

—(CH₂)₄OH

β-hydroxyethyloxymethyl

—CH₂—O—CH₂—CH₂—OH

β-hydroxyethylmercaptomethyl

—CH₂—S—CH₂—CH₂—OH

β,γ-dihydroxypropylmercaptomethyl

—CH₂—S—CH₂—CHOH—CH₂OH

Mercaptomethyl

—CH₂SH

β-mercaptoethyl-mercaptomethyl

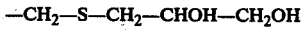
—CH₂—S—CH₂—CH₂—SH

β-carboxyethyl

—CH₂—CH₂—COOH

Aminomethyl

—CH₂—NH₂

δ-aminobutyl

—(CH₂)₄—NH₂ n-butylaminomethyl

—CH$_2$—NH—C$_4$H$_9$

Cyclohexylaminomethyl

—CH$_2$—NH—C$_6$H$_{11}$

These organopolysiloxanes can be obtained by known methods, for example, hydroxymethylpolysiloxanes, which are particularly suitable, can be obtained by a direct reaction of bromomethylpolysiloxanes with alcoholic potassium hydroxide. 4-Aminobutylpolysiloxanes are prepared by hydrogenating the readily available nitriles whereas the corresponding carboxyl derivatives are prepared by saponification of cyanoalkyl silicon compounds. Aminomethylsiloxanes are obtained by aminating halomethylsilicon compounds with ammonia or primary amines.

In many cases, the functional groups are first introduced in low molecular weight siloxanes. The resulting products are then converted into higher molecular weight polysiloxanes by the known equilibration reaction.

Polysiloxanes which contain at least two and preferably about 5 to about 100 siloxane groups and have a molecular weight of about 194 to about 20,000, preferably about 500 to about 6,000, are preferred. It is also preferred, especially for preparing non-ionic polyurethane polysiloxanes, to use substantially linear organofunctional polysiloxanes and those with hydroxyl end groups or amino end groups.

Aqueous ionic polyurethane polysiloxane dispersions may, however, also be prepared from polyfunctional organopolysiloxanes. Organopolysiloxanes of this kind have been described, for example, in U.S. Pat. No. 3,243,475. The following organofunctional polysiloxanes, for example, are suitable for the process according to the invention:

HO—CH$_2$—Si(CH$_3$)$_2$—O[Si(CH$_3$)$_2$—O]$_{1\text{-}2}$—Si(CH$_3$)$_2$—CH$_2$OH  (1)

2) HO—CH(CH$_3$)—CH$_2$—[Si(CH$_2$)$_3$—O]$_{11}$—Si(CH$_3$)$_2$—CH$_2$—O—CH(CH$_3$)—CH$_2$—OH

3) HO—CH$_2$—Si(CH$_3$)$_2$—O—Si(CH$_3$)$_2$—CH$_2$—OH  (3)

4) HO—CH$_2$—Si(CH$_3$)$_2$—O—[Si(CH$_3$)$_2$—O]$_{60}$—Si(CH$_3$)$_2$—CH$_2$—OH  (4)

5) n-C$_4$H$_9$—NH—CH$_2$—Si(CH$_3$)$_2$—O—[Si(CH$_3$)$_2$—O]$_{18}$—Si(CH$_3$)$_2$—CH$_2$—NH-nC$_4$H$_9$

6) C$_6$H$_{11}$—NH—CH$_2$—Si(CH$_3$)(CH$_3$)—O—[Si(CH$_3$)(CH$_3$)—O]$_n$—(Si(CH$_3$)(CH$_2$—NH—C$_6$H$_{11}$)—O—)$_m$—Si(CH$_3$)$_2$—CH$_2$—NH—C$_6$H$_{11}$ n = 60
m = 3

Nonionic polyurethane polysiloxanes can easily be prepared, for example, by a process of melt phase polyaddition at temperatures of about 100° C., either by introducing an organofunctional polysiloxane into an apparatus having a stirrer and adding a diisocyanate or by reacting, for example, a bis-aminoalkylpolysiloxane with a bis-chloro-carbonic acid ester. Alternatively, a prepolymer which contains isocyanate end groups may be introduced into the reaction vessel and an organofunctional polysiloxane added thereto, to which low molecular weight glycols or diamines may be added. The important aim is to obtain a polyurethane polysiloxane with a very high molecular weight. For this reason the isocyanate groups and H-acidic groups are used in approximately equivalent quantities. The addition of solvents facilitates the homogeneous addition to the coagulating elastomer solution by stirring.

Polysiloxane polyurethanes which contain ionic groups may also be used advantageously for the process according to the invention. Compounds of this kind which contain cationic or anionic groups are formed during the polyaddition reaction, for example, when chain lengthening agents which contain tertiary nitrogen groups are built in and quaternized with dimethylsulphate. Diamines or glycols which contain sulphonate groups may also be used. It is particularly advantageous to prepare ionic polyurethane or polyurethane urea dispersions directly in an organic solvent which is diluted with water, for example a mixture of dimethylformamide and water. Suspensions of this kind may at any time be stirred directly into a polyurethane elastomer solution as pore regulator and stabilizer for coagulation.

It is less advantageous to build the siloxane sequences directly into the total quantity of polyurethane elastomers which are required to be coagulated because this causes vigorous foaming during the degasification stage and cell regulation cannot be achieved to the same extent as in those cases when polyurethane polysiloxanes which have been prepared separately and which contain a relatively high proportion of polysiloxane structural units are added to an elastomer solution which is free from siloxane groups.

According to a preferred method of carrying out the process, not only polysiloxane polyurethanes but, in addition, cationic polyurethane dispersions or polyurethane urea dispersions are added as additional coagulating agents to the polyurethane or polyurethane urea solutions which are required to be coagulated. This has the advantage that the quantity of polyurethane polysiloxane required to ensure reproducible coagulation of the polymer solution is in such case generally very low, namely at the lower limit of the range given above, which may be desirable for economic reasons.

The quantity of cationic polyurethane or polyurethane urea dispersions added to the solution which is to be coagulated is preferably up to about 25% by weight (based on the total quantity of solid polyurethane). The polymers, which generally contain quaternary ammonium groups, have a partly hydrophilic character and can be dispersed or form colloidal solutions in water or aqueous liquids such as mixtures of water and dimethylformamide without the aid of emulsifying or wetting agents.

Cationic polyurethanes suitable for the process according to the invention may be obtained, for example, by the process according to U.S. Pat. No. 3,575,894 if at least one of the components used for synthesizing the polyurethane contains one or more basic tertiary nitrogen atoms and the basic tertiary nitrogen atoms of the polyurethane are reacted with alkylating agents or inorganic or organic acids. It is in principle immaterial in what position of the polyurethane macromolecule the basic nitrogen atoms are situated.

Conversely, polyurethanes which contain reactive halogen atoms capable of being quaternized may be reacted with tertiary amines. Furthermore, cationic polyurethanes may also be prepared by a quaternization process which is accompanied by chain lengthening, for example, by preparing dihalourethanes from diols which may be high molecular weight and isocyanates which contain reactive halogen atoms or diisocyanates and halogenated alcohols, and then reacting these dihalourethanes with ditertiary amines. Conversely, ditertiary diaminourethanes may be prepared from compounds which contain two isocyanate groups and tertiary amino alcohols and then reacted with reactive dihalogenated compounds. The cationic polyurethane mass may, of course, also be prepared from a cationic, salttype starting component such as a quaternized basic polyether or an isocyanate which contains quaternary nitrogen. These methods of preparation have been described, for example, in U.S. Pat. Nos. 3,388,087; 3,480,592; 3,479,310 and 3,535,274 and in British Patent No. 1,006,151.

Suitable starting materials for synthesizing the salt-type polyurethanes are also mentioned there.

The aqueous dispersions or colloidal solutions of these cationic polyurethanes have particle sizes of between about 0.10 to about 100 $\mu m$. They may also contain organic solvents, for example, acetone or dimethylformamide. The solvent used for preparing the dispersion according to U.S. Pat. Nos. 3,388,087; 3,480,592 and 3,479,310 therefore, need not be removed from the resulting dispersion and, moreover, high boiling solvents such as dimethylformamide may also be included when preparing the dispersion, as already described in connection with the preparation of ionic polyurethane polysiloxane dispersions.

The preferred cationic polyurethanes used for the process according to the invention are prepared from higher molecular weight polyhydroxyl compounds which have a molecular weight of about 500 to about 5000 organic polyisocyanates, a basic chain lengthening agent which contains tertiary and preferably aliphatically substituted nitrogen atoms, e.g. N-methyl-diethanolamine or N,N,-bis(aminopropyl)methylamine and optionally other, non-basic chain lengthening agents such as, preferably, glycols or also diamines, water, hydrazine or substituted hydrazines. The polyurethane mass, which is predominantly linear and soluble in organic solvents such as dimethylformamide in the cold preferably contains from about 5% to about 12% of N-methyldiethanolamine. About 10 to 100% of the tertiary nitrogen thereby incorporated in the polyurethane mass are quaternized with an alkylating agent such as dimethylsulphate, methylchloromethylether, diethyl sulphate or bromoethanol and, if desired, the remaining tertiary nitrogen is partly or completely neutralized with an acid such as hydrochloric acid, lactic acid or acetic acid in the presence of water.

It is advantageous to use at least a proportion of bifunctional or trifunctional alkylating agents such as dibromobutane, p-xylylenedichloride, 1,3-dimethyl-4,6-bis-chloromethylbenzene, methylene-bis-bromoacetamide or trimethylolpropane-tris-chloroacetic acid esters and bifunctional or trifunctional acids which have $P_K$ values below 4 such as phosphoric acid or sulphuric acid, in each case as aqueous solutions, these agents initially acting predominantly as monofunctional compounds and subsequently carrying out a cross-linking function in the finished microporous sheet.

The prepared cationic polyurethanes are dispersed in water. The dispersed polyurethanes may, of course, also contain groups such as methylolether groups built into the molecule for subsequent cross-linking purposes.

A suitable cationic dispersion in a mixture of dimethylformamide and water may, for example, be prepared as follows: A polyester which contains hydroxyl end groups is reacted with a diisocyanate to form a prepolymer which is diluted with dimethylformamide and then reacted with N-mehyldiethanolamine. The reaction product is then quaternized with di-chlorodurol (1,4-bis-chloromethyl-benzene) and phosphoric acid and a mixture of equal parts of dimethylformamide and water are added.

If a non-ionic polyurethane polysiloxane is to be used together with a ionic polyurethane dispersion, these two coagulating agents may be added separately to the polymer solution or the polyurethane polysiloxane may be emulsified in the aqueous polyurethane dispersion or suspension, optionally already at the stage of preparation, and then added to the polyurethane elastomer solution in this form before coagulation is carried out.

The polymer solutions may also contain additives without the coagulation performance being thereby deleteriously affected, e.g. polyvinyl chloride and its copolymers, polyacrylonitrile and its copolymers, commercial anionic tanning agents, carboxymethylcellulose, polyalkylacrylates or methacrylates, emulsifiers, optical brightening agents, antioxidants, special light protective agents such as N,N-dialkylhydrazides, substances which have a cross-linking action such as paraformaldehyde, melamine hexamethylolether or other formaldehyde derivatives, polyisocyanates, quaternizing agents, polyaziridine ureas and dyes, particularly insoluble pigments.

The coagulability of the polyurethane solutions may in addition be influenced by the addition of non-solvents, preferably water, to the coagulable polyurethane systems. The maximum possible quantity of non-solvent is reached when the polyurethane begins to precipitate. Non-solvent (water) can also be introduced into the system by adding ionic polyurethane dispersions. In this case also, an additional non-solvent may be added. The non-solvent is generally not added in the pure form but as a mixture with solvents, e.g. in the form of a mixture of dimethylformamide and water. The total proportion of non-solvent in the coagulable mixture should generally not exceed about 9% by weight and preferably not 6% by weight.

The use of the additives according to the invention has, however, the major advantage that the accurate measurement of the quantity of non-solvent which was necessary in the known processes of the art, for example, at the stage of pre-gelling on a movable substrate by means of water vapor, is no longer required. Moreover, the composition of the coagulation bath is also of minor importance, for example, products which have excellent properties are obtained when polyurethane solutions containing the coagulation regulators according to the invention are directly coagulated in water without the addition of a nonsolvent.

For the continuous production of microporous sheets, the polymer solution which contains polyurethane polysiloxanes or the mixture of polyurethane solution and ionic polyurethane dispersions is applied to a porous or non-porous substrate, e.g. by painting, casting or application with a coating knife, and the layer applied to the substrate may then be passed through a treatment room with a water vapor atmosphere to cause gelling to form a sheet. The material is then passed through a coagulating bath, an irrigation bath and an after-treatment bath which may be an alcohol bath. The microporous sheet is then dried.

The thickness of the layer applied depends on the desired final thickness of the microporous sheet. It is generally sufficient to apply the polyurethane mixtures in a thickness of from 0.5 to 1.5 mm. The substrate chosen will be a porous one if it is to be coated directly with the polyurethane. Suitable porous substrates are e.g. woven and knitted fabrics, non-woven fleeces or felts, bu random fiber fleeces may also be microporously bonded with the polymer solution mixtures.

Non-porous substrates, e.g. a glass plate, a metal belt which may have a structured surface or a web of textile fabric coated with plastics such as perfluoropolyethylene are used when it is desired to obtain porous polyurethane sheets which can be removed and transferred to other substrates, e.g. with adhesives, by the reversal process. Suitable substrates of this type are, for example, wood, split leather, paper board, paper or woven and non-woven textile sheets.

The determination of permeability to water vapor given in the examples if carried out by the method according to I UP 15 described in "Das Leder", 1961, pages 86–88, by which the permeability to water vapor is obtained in terms of mg/h.cm$^2$ (determined at normal pressure and a relative humidity of 65% to 20° C.). Determination of the tensile strength, elongation at break and moduli and other elastic properties of the microporous sheets is carried out by known methods.

The strength properties of the microporous films generally, of course, decrease with increasing permeability to water vapor. Moreover, at a given permeability to water vapor, the strength properties depend to a major extent on the quality and uniformity of the microporous structure, which in turn are determined by the coagulation process employed. A particular advantage of the process according to the invention is that it results in uniformly microporous sheets which have a high quality surface, high temperature resistance, high strength properties and distinctly better abrasion properties than those of sheets obtained by other processes but, at the same time, they have high permeability to water vapor and, moreover, the process can be carried out without an accurately defined addition of non-solvent and within a shorter time.

The high permeability to water vapor which is achieved even with elastomer solutions which previously could not be coagulated to form microporous structures on a commercial scale, is presumably due to the fact that the addition of polyurethane polysiloxane causes the penetration of water during the coagulation process to proceed uniformly and without any closure of pores on the surface, with the result that the so-called "serum streaks" which often occur during the gelling phase or "water waves" which are formed on immersion in water and which would render a microporous sheet practically useless, are prevented from forming.

Another feature which is an advantage for production is that the longitudinal warping of the steel strip which occurs during prolonged use is compensated by the polyurethane polysiloxanes, and the reduction in shrinkage of the finished product reduces the tension in rolled up sheets which might otherwise cause the sheets to stick, especially in the interior of the roll.

The microporous sheet provided by the invention can be used to make shoes, raincoats and other articles of clothing.

The following examples and comparison examples explain the advantages of the process according to the invention.

(A) Preparation of the polyurethane (urea) polysiloxanes Product 1:
50% non-ionic polyurethane polysiloxane solution Reaction mixture:
  125.00 parts by weight of polyester 1
  25.15 parts by weight of hexamethylene diisocyanate
  96.15 parts by weight of organofunctional siloxane I, $n$ = about 14, hydroxyl content 2.7% by weight, MW = 1260 (=39.1% by weight based on the total solids content)
  246.30 parts by weight of dimethylformamide (ratio of NCO:OH = 1.00).

The dehydrated polyester is introduced into a vessel provided with a stirrer and reacted with hexamethylene diisocyanate at 100° C. for 30 minutes under substantially anhydrous conditions. The isocyanate content of the reaction product at the end of the reaction is 4.3% (theoretical 4.26%).

The total quantity of organofunctional polysiloxane I is then stirred into the reaction product also at 100° C. and slowly reacted for 3 hours. The reaction mixture gradually becomes homogeneous after 30 minutes. The isocyanate content of the reaction mixture is 0.25% by weight after 60 minutes, 0.15% by weight after 120 minutes, less than 0.02% by weight after 180 minutes. The reaction is practically complete after 3 hours.

The reaction mixture is then diluted with dimethylformamide in three portions (1:2:2) and then stirred for one hour. The viscosity of the 50% solution after the reaction is 5000 cp at 25°C.

Polyester 1: from hexanediol/neopentylglycol (1:1) and adipic acid (hydroxyl number 66, acid number 1).

Siloxane I:

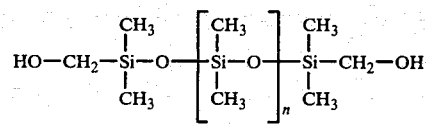

Product 2:

In a manner similar to that used for Product 1 (NCO/OH ratio = 1.00), 125 parts by weight of polyester 2, 25 parts by weight of tolylene-2,4- and -2,6-diisocyanate (ratio of isomer 65:35) and 70 parts by weight of organofunctional siloxane I ($n$ = about 14; hydroxyl content 2.7% by weight; MW'1260) are reacted together and diluted with 220 parts by weight of dimethylformamide.

The viscosity of the 50% solution which is free from isocyanate groups is 6200 cP/25° C.

Polyester 2: from ethylene glycol and adipic acid/phthalic acid (1:1); hydroxyl number 62, acid number 1.

Product 3:

Cationic polyurethane polysiloxane 59% solution, NCO/OH ratio = 1.00.

Reaction mixture:

24.3 parts by weight of polyester 1,
6.08 parts by weight of hexamethylene diisocyanate,
0.758 parts by weight of N-methyldiethanolamine,
18.4 parts by weight of dimethylformamide
0.795 parts of weight of dimethylsulphate dissolved in
1.2 parts by weight of dimethylformamide
12.4 parts by weight of dimethylformamide and
13.6 parts by weight of organofunctional Siloxane I, hydroxyl content 2.7% (= 29.9% by weight, based on the total solids).

The polyester is dehydrated under vacuum at 130° C. for 30 minutes, and hexamethylene diisocyanate is then added at 100° C. After a reaction time of one hour at 100° C. under substantially anhydrous conditions, the isocyanate content is 6.20% (theoretical 6.05%).

When the reaction mixture has cooled to 60° C., methyl diethanolamine is stirred in and reacted at this temperature for one hour. The reaction mixture is then diluted with the first portion of dimethylformamide and after a further 10 minutes the dimethylsulphate solution is added.

The last portion of dimethylformamide is then added at 60° C. When the theoretical isocyanate content has been reached (2.05%), the organofunctional siloxane is stirred in and reacted to completion at 60° to 70° C.

The viscosity of the finished solution is 4,300 cP. The solution can be diluted with any quantity of water.

Product 4:

Anionic polysiloxane polyurethane urea suspension.

The solution in 390 parts by weight of dimethylformamide of a prepolymer which contains 2.54% by weight of free isocyanate groups and which has been prepared from 170 parts by weight of polyester 1, 84 parts by weight of hexamethylene diisocyanate and 136 parts by weight of organofunctional Siloxane I (hydroxyl content 5.5% by weight, MW = 620 $n$ = about 6) is reacted with 80% of the equivalent quantity of β-aminoethyl-aminoethanol sulphonic acid sodium which is added dropwise in the form of an aqueous solution with stirring and at such a rate that the ratio of solids:dimethylformamide:water is 1:1:1.

The viscosity of the suspension which is free from isocyanate groups and which contains a sediment which is redispersible is 570 cP/25° C.

Product 5:

173 parts by weight of butane-1,4-diol are introduced at 60° C. with stirring into an anhydrous prepolymer solution which contains 1.65% of free isocyanate groups and is composed of 1,354 parts by weight of 4,4'-diisocyanato diphenylmethane, 3,750 parts by weight of polysiloxane I (hydroxyl content 2.5% by weight, MW = 1360, $n$ = about 17) and 5,095 parts by weight of dimethylformamide, and the reaction mixture is kept at this temperature under anhydrous conditions for about 3 hours until the polysiloxane-polyurethane solution is free from isocyanate groups. The viscosity of the solution is 238 cP at 25° C.

(B) Cationic dispersion free from siloxane groups 900 parts by weight of polyester 2 are reacted under anhydrous conditions with 231 parts by weight of tolylene diisocyanate (65/35 mixture of 2,4- and 2,6-isomers)

at 70°–75° C. for 2 hours and the prepolymer is then diluted with 756 parts by weight of dimethylformamide at 50° C. 91 parts by weight of N-methyldiethanolamine are then added, followed after a further 30 minutes by 24.5 parts by weight of dichlorodurol in 150 parts by weight of dimethylformamide. The quaternizing reaction is completed after 1 hour at 50° C.

24 parts by weight of 90% phosphoric acid in 100 parts by weight of water, 880 parts by weight of dimethylformamide which has been heated to 50° C. and 1070 parts by weight of water at 30° C. are then added. After the reaction mixture has been stirred for 30 minutes, the resulting dispersion which has a solids content of about 28% by weight is left to cool.

(C) Preparation of the polyurethane elastomers

Elastomer solution 1:

A prepolymer of 1,240 parts by weight of polyester 3 and 310 parts by weight of 4,4'-diphenylmethane diisocyanate is diluted with a total of 4,700 parts by weight of dimethylformamide and reacted with 50 parts by weight of carbodihydrazide in 100 parts by weight of water. The 25% elastomer solution has a viscosity of about 25,000 to 50,000 cP at 25° C.

Polyester 3:

of adipic acid and ethylene glycol/butane-1,4-diol (1:1); hydroxyl number 56, acid number 1.

Elastomer solution 2:

An elastomer granulate which has been prepared by melt phase polyaddition at 110° C. to 140° C. from the following components:

50 parts by weight of polyester 3,
50 parts by weight of polyester 4,
48 parts by weight of 4,4'-diphenylmethane diisocyanate and
13 parts by weight of butane-1,4-diol is dissolved in 25% dimethylformamide at 50° C. A homogeneous solution having a viscosity of 15,000–60,000 cP is obtained.

Polyester 4:

Hexane-1,6-diol polycarbonate, hydroxyl number 56, acid number 1.

(D) Preparation of the microporous sheets

Polyurethane-polysiloxane (urea) is added portionwise to the polyurethane (urea) solution (viscosity of 22% solution at 25° C.: 10,000–30,000 cP) which has been heated to 50° to 80° C. and the mixture is vigorously stirred under anhydrous conditions until homogeneous. The cationic dispersion which is free from siloxane groups or the anionic tanning agent Tanigan (phenol formaldehyde resin) may be added at the same time. Before coagulation is carried out, the reaction mixture is degasified under vacuum until all the air stirred into it has been completely removed.

The reaction mixture which is now free from bubbles is applied to a steel belt 2 m in width and adjusted to a width of 1.90 m and thickness of about 1.5 mm with a coating knife. The material is then passed through a preliminary gelling zone where it is exposed to moist air (atmospheric moisture 30 to 70%, 45° to 90° C.). The steel belt is then passed through a bath of water, whereby the sheet is finally coagulated. The sheet is then washed and dried in a heating zone at about 100° C.

Using the same principle, a textile substrate is directly coated in Example 9. The textile substrate used is a cotton fabric.

The coagulated sheets or textile coatings have a thickness of 0.33 ± 0.03 mm.

The results of the experiments are summarized in the following table. The examples marked with * are comparison examples. The quantities are in parts by weight, based on the solids content.

TABLE

| Ex. | Polysiloxane polyurethane | Elastomer solution | Additives Cationic dispersion 6 | Tanigan | Coagulation | Permeability to water vapor (mg/cm²/h) | Tensile strength kp/cm² | Elongation at break % | Tear propagation resistance kp/cm |
|---|---|---|---|---|---|---|---|---|---|
| 1* | — | 80 parts 1 batch 63 | 20 parts | 10 parts | on separating support (steel belt) | 0.0 | — | — | — |
| 2 | 1.2 parts 1 | " | " | " | " | 12.3 | 113 | 585 | 9.5 |
| 3* | — | 80 parts 1 batch 67 | " | " | " | 3.4 | — | — | — |
| 4 | 2.3 parts 2 | " | " | " | " | 9.5 | 97 | 645 | 8.8 |
| 5* | — | 80 parts 1 batch 69 | " | " | " | 6.2 | — | — | — |
| 6 | 4.0 parts 3 | " | " | " | " | 13.7 | 108 | 610 | 7.9 |
| 6a | 2.5 parts 5 | " | " | " | " | 11.8 | 93 | 570 | 7.1 |
| 7* | — | 80 parts 2 | none | none | " | 0.0 | — | — | — |
| 8 | 20.0 parts 4 | " | " | " | " | 9.2 | 86 | 693 | 6.5 |
| 9 | 10.0 parts 4 | " | " | " | textile substrate | 8.7 | — | — | — |

| Ex. | Folding strength Balli-Flexometer | Abrasion | Remarks |
|---|---|---|---|
| 1* | — | — | Unusable, transparent sheet |
| 2 | 200,000 | very slight | Uniform microporous sheet |
| 3* | — | — | Sheet is unusable owing to serum streaks |
| 4 | 200,000 | very slight | Uniform microporous sheet as in Example 2 |
| 5* | — | — | Unusable owing to "water waves" |
| 6 | 200,000 | very slight | Uniformly microporous as in Example 2 |
| 6a | 200,000 | very slight | |
| 7* | — | — | Unusable because transparent as in Example 1 |
| 8 | 200,000 | slight | Exceptionally fine, uniform microporous structure |
| 9 | 200,000 | slight | |

The examples clearly show that coagulation carried out without the additives according to the invention may lead to widely differing products if different batches of the same polyurethane are used under otherwise identical conditions.

Undesirable transverse streaks which may be due to surface effects at the boundary between elastomer solution and coagulation liquid do not occur when the coagulation regulators according to the invention are used.

As can be seen from comparing Examples 2 and 8, the degree of fineness of the micropores can be adjusted as desired by varying the quantity of coagulation regulator.

Although the invention has been described in detail for the purpose of illustration it is to be understood that such detail is solely for that purpose and variations can be made therein by those skilled in the art without departing from the spirit and scope of the invention except as it may be limited by the claims.

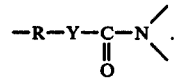

What is claimed is:

1. In a process for making microporous sheets which are permeable to water vapor comprising applying a polyurethane in a hygroscopic polar solvent to a substrate, coagulating the polyurethane with a non-solvent for the polyurethane, removing the solvent and non-solvent, and optionally, removing the substrate, the improvement which comprises coagulating a solution containing a polyurethane which has the following structural unit

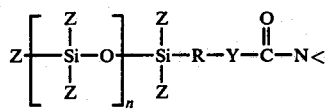

in which
$n \geq 2$ $Z$ = an alkyl group containing 1 to 5 carbon atoms, an aryl radical containing 6 to 15 carbon atoms, a siloxyl or siloxanyl group or

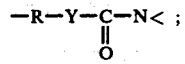

the groups Z being the same or different;
$R$ = an alkylene group and
$Y$ = —NH—, —O—, —S— or $NR_1$
where
$R_1$ is an alkyl group containing 1 to 5 carbon atoms or a cyclohexyl radical and the total quantity of siloxane sequences in the microporous polyurethane sheet is about 0.1 to about 20% by weight.

2. The process of claim 1 wherein a high molecular weight polyurethane polysiloxane having a siloxane content of about 5 to about 60 percent by weight, and a molecular weight of about 5000 to 30,000 is prepared and added to a hygroscopic polyurethane solution before coagulation.

3. The process of claim 1 wherein the polysiloxane-polyurethane contains ionic groups and is used while diluted with a solvent or water.

4. The process of claim 1 wherein a non-ionic polysiloxane polyurethane is emulsified in an aqueous polyurethane dispersion or suspension, and added in this form to a polyurethane elastomer solution which is to be coagulated, before coagulation is carried out.

5. The process of claim 1 wherein $n = 5$ to 100, Z = methyl, and the siloxane units in the sheet are about 0.3 to about 5% by weight.

6. The product of the process of claim 1.

7. The process of claim 1 wherein the said polyurethane is the solution of a polyurethane urea.

8. The process of claim 1 wherein the polyurethane in the solution prior to coagulation is free from urea linkages.

9. A process according to claim 1 wherein only one of the Z substituents attached to a silicon atom is the group